July 29, 1924.

G. H. ELWELL 1,503,442

SEPARABLE FASTENER

Filed Dec. 4, 1922

WITNESSES:
Dorothy A. Elwell.
Charles A Elwell

George Henry Elwell
INVENTOR

Patented July 29, 1924.

1,503,442

UNITED STATES PATENT OFFICE.

GEORGE HENRY ELWELL, OF CLEVELAND, OHIO, ASSIGNOR TO CARR FASTENER COMPANY, OF CAMBRIDGE, MASSACHUSETTS, A CORPORATION OF MAINE.

SEPARABLE FASTENER.

Application filed December 4, 1922. Serial No. 604,875.

*To all whom it may concern:*

Be it known that I, GEORGE HENRY ELWELL, a citizen of the United States, residing at Cleveland, in the county of Cuyahoga and State of Ohio, have invented certain new and useful Improvements in Separable Fasteners, of which the following is a specification.

My invention relates to improvements in separable fasteners and more particularly to stud and socket fasteners separable by relative tipping movement in one direction only.

The object of my invention is to provide a stud member with a stud head and a socket member with a stud passage presenting upon diametrically opposite surfaces of the stud post parallel engaging surfaces of which one is rigid and the other is resilient.

With this and other objects in view, as will more fully hereinafter appear, the invention consists in certain features of novel construction and arrangement of parts hereinafter described, illustrated in the accompany drawing and particularly pointed out wherein patentable novelty is claimed for certain features of the device, it being understood that within the scope of what hereinafter thus is claimed various changes in form, proportion, size and minor details of the construction can be made without departing from the spirit or modifying any of the advantages of the invention.

Figure 1:
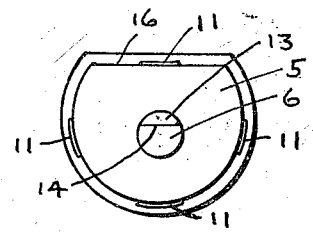
Figure 2:
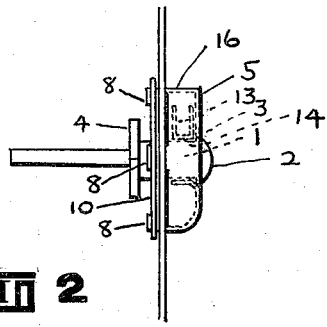
Figure 3:
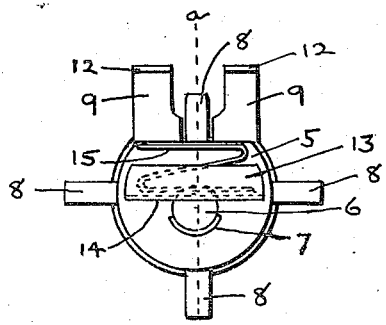
Figure 4:
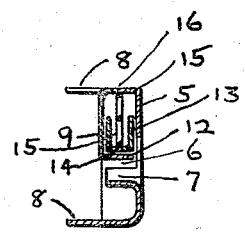
Figure 5:
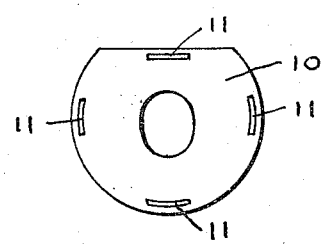

The following is the description of an embodiment of my invention reference being had to the accompanying drawing in which Figure 1 is a face view of the socket member; Figure 2 is a side view of socket member engaged by stud, the parallel stud engaging surfaces of the socket member being shown in dotted line; Figure 3 is an interior upright view of the socket member; Figure 4 is a cross-sectional view of the socket member on line $a$—$a$ of the next preceding figure, but with certain sections folded; Figure 5 is an upright view of the clamp-plate of the socket member; and Figure 6 is a side view of stud member and a cross-sectional view of the socket member, the members being relatively tipped to correct position for separation.

Figure 6:
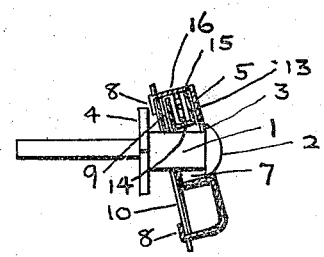

Referring more particularly to the drawing in which similar parts are similarly numbered I have, preferably shown a stud 1 having a head 2 providing a rearwardly facing abrupt shoulder 3, as shown in Figures 2 and 6. While base 4 of the stud member is shown as a rivet the attaching means may be of any other desired form for attaching that member to solids or to fabric. Cooperating with this stud member I provide a socket member preferably as shown. This socket comprises a front-plate 5 which is provided with stud passage 6 having a semi-tubular extension 7 extending rearwardly, as shown in Figures 2, 3, 4 and 6, to provide a rigid support for the stud post 1. Integral with front-plate 5 are sections 8 and 9, said sections 8 provide the attaching means of the socket member to fabric when the fabric is placed between the front-plate 5 and clamp-plate 10, as shown in Figure 2, and sections 8 are made to enter slots 11, best shown in Figure 5, and fold backwardly against the outer surface of clamp-plate 10, as shown in Figures 2 and 6. Said sections 9, when folded as shown in Figure 4, form not only a partial enclosing wall for the casing of the socket member but the bent extremity 12 of each of said sections provides proper support on either side of the stud passage for the movable member of the device. This movable member comprises a resilient blocking means 13 which may be constructed from solid metal in block form but which I preferably construct from sheet metal formed up in such a manner that a cross-section thereof forms the letter U with a square base adapted to rest in folded arms 9, with their bent extremities 12, and thus intersect the stud passage 6 of the socket member, as best shown in Figures 1 and 3. An S spring 15 rests partially within the channel formation of the blocking means 13 with the exposed arm of said spring bearing against the interior straight rim 16 of the front-plate 5 of the socket member thus providing a spring tension normally maintaining blocking means 13 in engagement with bent extremities 12 of enclosing arms 9.

In interlocked position the stud is firmly held by the socket member, the under exterior surface of base 14 of blocking means 13, lying in a parallel plane with that of the stud engaging surface of the rigid stud supporting shoulder 7, is spring-pressed down upon the stud post and behind abrupt shoulder 3 forcing the stud member against its rigid support 7 where it is snugly held with socket member in erect position as shown in Figure 2.

To separate the fastener members it is necessary to tip, for instance, the socket member upon the stud member in a particular direction, as shown in Figure 6. This tipping movement forces the parallel engaging surfaces of both rigid and resilient stud supporting members out of alignment with the exterior longitudinal surface of the stud post sufficiently to permit the square edge of base 14 of blocking means 13 to pass the abrupt shoulder 3 of the stud head 2. The socket member is provided with a straight edge 16, as best shown in Figure 1, as a designation of tipping direction and also to better facilitate the tipping movement of that member when the stud member is short.

What I claim is:

1. A separable fastener comprising a stud member including a stud-post and a stud-head, said stud-head having a rearwardly facing abrupt shoulder; and a socket member having a suitable casing, said casing providing a rigid stud-post-engaging element; a yielding element mounted within said casing and diametrically opposing said rigid element, said yielding element having two stud-post-engaging angles, the distance between said angles definitely predetermining the necessary degree of tipping movement of one of the fastener members upon the other by which, by said movement alone, said members are separable when said yielding element is in positive interlocked engagement behind said abrupt shoulder.

2. A separable fastener comprising a stud member including a stud-post and a stud-head, said stud-head having a rearwardly facing abrupt shoulder; and a socket member having a suitable casing, said casing providing a rigid stud-post-engaging element; a yielding element mounted within said casing and diametrically opposing said rigid element and providing a second stud-post-engaging element, one of said stud-post-engaging elements having two stud-post-engaging angles, one of said angles being adapted for a positive interlocked engagement behind said abrupt shoulder, the distance between said angles definitely predetermining the necessary degree of tipping movement of one of the fastener members upon the other by which, by said movement alone, said members are separable.

3. A separable fastener comprising a stud member and a socket member, said stud member comprising a stud-post having an attaching base and a head providing a rearwardly facing abrupt shoulder, said socket member comprising a suitable casing providing a rigid stud-post-engaging-and-supporting surface extending from said head in the longitudinal direction of said stud-post and lying in a plane parallel with that of the axis of said stud member; a resilient member mounted within said casing and providing a stud-post-engaging surface extending from said head in the longitudinal direction of said stud-post and diametrically opposing, and parallel with, said rigid surface, said resilient member being adapted to positively interlock behind said abrupt shoulder and permit the separation of the fastener members only upon the proper tipping movement of one of said members upon the other to break said parallel engagements and to allow said resilient member to clear said abrupt shoulder.

4. In a separable fastener the combination of a stud member comprising a stud-post having a head providing a rearwardly facing abrupt shoulder; and a socket member comprising a casing having a stud passage; a yielding blocking member of geometrical body formation having two stud-post-engaging-angles of substantial distance apart, said blocking member being slidably mounted within said casing and adapted to intersect said stud passage for a yielding engagement with said stud head upon the entrance of said stud into said stud passage; and a spring mounted within said casing and adapted to normally maintain said blocking member in said intersecting position, whereby when said members are in fully engaged position said stud-post is engaged by both of said engaging angles and when said members are in proper tipped relation, one to the other, one of said engaging angles functions as a fulcrum to lift the other engaging angle sufficiently from said stud-post to clear said abrupt shoulder preparatory to the separation of said fastener members.

5. A separable fastener comprising a stud post member having a head presenting rearwardly an abrupt shoulder; a socket member having a stud passage provided with a rigid stud-post seat; and a resilient blocking member movably mounted within said socket member and presenting itself, when said members are in inter-locked engagement, behind said abrupt shoulder in a two-point engaging contact with said stud-post diametrically opposite to said rigid stud-post seat, whereby, when one of said members is in proper tipped relation to the other of said members, said resilient blocking member yieldingly breaks the engaging contact nearer said abrupt shoulder sufficiently to permit that engaging point of said resilient blocking member to clear said abrupt shoulder preparatory to the disengagement of said members.

6. A separable fastener comprising a stud-post member having a head presenting rearwardly an abrupt shoulder, and a socket member having a stud-passage; opposing stud-post-engaging members with which said stud-passage is provided, said opposing members providing stud-post-engaging surfaces extending from said head in the longitudinal direction of said stud-post, one of said engaging members being adapted to positively interlock behind said abrupt shoulder; and spring means adapted to maintain said opposing members in planes parallel to that of the axis of said stud-post so that when the fastener members are in interlocked position and the socket member remains in erect position said parallel opposing members gripping said stud-post provide rigidity to the fastening and prevent separation of the fastener members until a proper tipping movement of one of the members upon the other breaks said parallel grip and permits the interlocked engaging member to clear said abrupt shoulder.

7. A separable fastener comprising a stud-post having a head providing a rearwardly facing abrupt shoulder, and a socket member comprising a casing having a stud passage; a resilient blocking member of geometrical body formation having two stud-post-engaging-angles of substantial distance apart, said resilient member being slidably mounted within said casing and adapted to normally intersect said stud passage for a yielding engagement with said stud head upon the entrance of said stud-post into said stud passage, whereby, when said members are in interlocked position, said stud-post is engaged by both of said stud-post-engaging-angles, and, when said members are in a proper tipped relation, one to the other, one of said engaging-angles provides a fulcrum by which the other engaging-angle is sufficiently lifted from said stud-post to clear said abrupt shoulder preparatory to the separation of said fastener members.

8. A separable fastener comprising a stud-post having an attaching base and a suitable head, and a socket member comprising a chambered sheet-metal casing having a stud-passage; a stud-post-supporting shoulder integral with said casing and formed inwardly from the metal taken from said casing in the construction of said stud-passage and extending substantially through said passage, said shoulder presenting to said stud-passage a stud-supporting surface adapted to engage the surface of said stud-post extending from said head rearwardly toward said base and in a plane parallel to that of the axis of said stud-post; and a spring-pressed member mounted within said casing and adapted to be maintained in a position opposing said stud-post-supporting shoulder.

9. A separable fastener comprising a stud-post having a head providing a rearwardly facing abrupt shoulder; a socket member having a stud passage; opposing stud-post engaging members with which said passage is provided, one of said stud-post engaging members presenting to said stud-post a surface provided with two stud-post engaging angles of substantial distance apart; and resilient means with which said socket member is provided adapted to normally maintain a lesser distance between said opposing stud-post engaging members than the diameter of said stud-post, said socket member being thus adapted for disengagement from said stud-post only upon a proper tipping movement of said socket member on said stud-post, the said stud-post engaging angle nearer said shoulder being thereby lifted sufficiently to clear said abrupt shoulder by reason of said other stud-post engaging angle functioning as a fulcrum and thus increasing the distance between said opposing stud-post engaging members against the tension of said resilient means.

GEORGE HENRY ELWELL.